No. 753,573. PATENTED MAR. 1, 1904.
C. F. HETTINGER.
COOLING TOWER.
APPLICATION FILED SEPT. 23, 1903.

NO MODEL.

Witnesses:
H. W. Bormann
M. Bormann

Inventor:
Carl F. Hettinger
by Hermann Bormann
Att'y

No. 753,573. Patented March 1, 1904.

UNITED STATES PATENT OFFICE.

CARL F. HETTINGER, OF BOSTON, MASSACHUSETTS.

COOLING-TOWER.

SPECIFICATION forming part of Letters Patent No. 753,573, dated March 1, 1904.

Application filed September 23, 1903. Serial No. 174,293. (No model.)

*To all whom it may concern:*

Be it known that I, CARL F. HETTINGER, a citizen of the United States, residing at the city of Boston, in the county of Suffolk and State of Massachusetts, have invented new and useful Improvements in Cooling-Towers, of which the following is a specification.

My invention relates to apparatus or structures for cooling liquids, and principally water, which having been heated while performing functions in manufacturing various kinds of products, distilling, brewing, refining, &c., would go to waste if its temperature was not lowered to such a degree as that it may be used again for the same or other functions or purposes.

The object of my invention is to provide means by which water or liquids are cooled and aerated very effectively; and to this end my invention consists of providing a tower-like structure divided into air and water shafts having hot-water-outlet pipes at its top, a series of perforated planes arranged one below each other in the water-shafts, a catch-basin below said water-shafts and the central air-shaft, fans for forcing air into the shafts from the bottom of said shafts and means for regulating the communication between the water-shafts and central air-shaft; and my invention further consists of the improvement hereinafter more fully described, and pointed out in the claims.

My invention will be more fully understood taken in connection with the accompanying drawings, in which—

Figure 1:
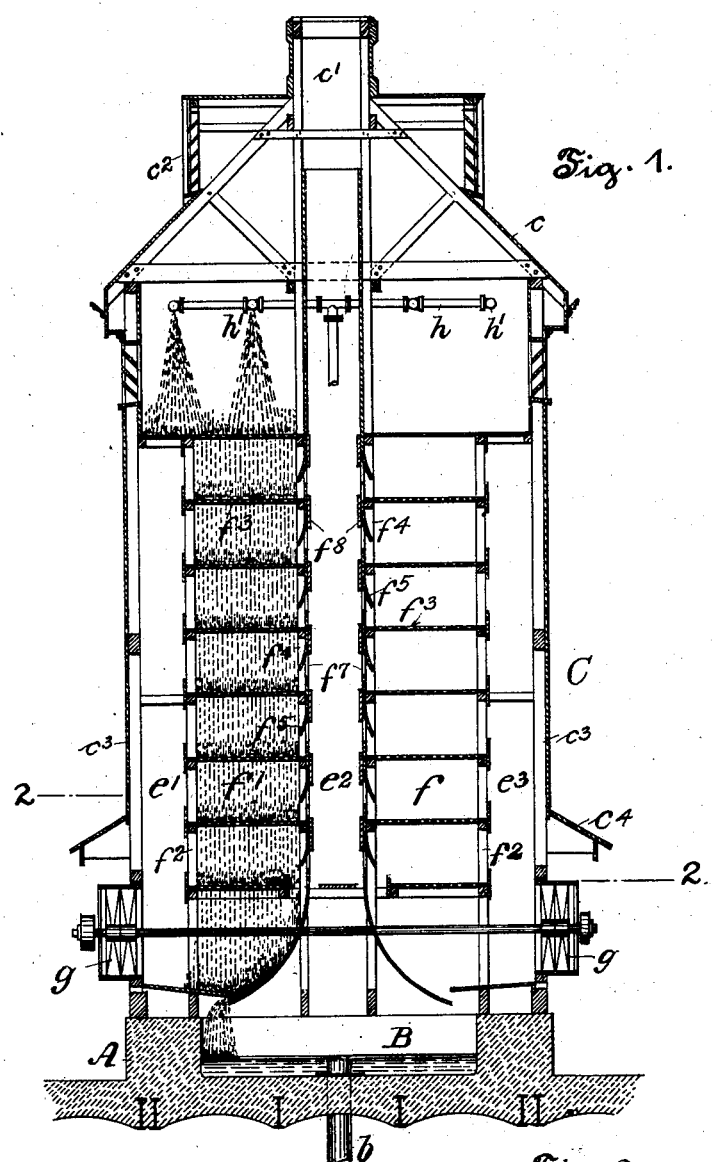
Figure 2:
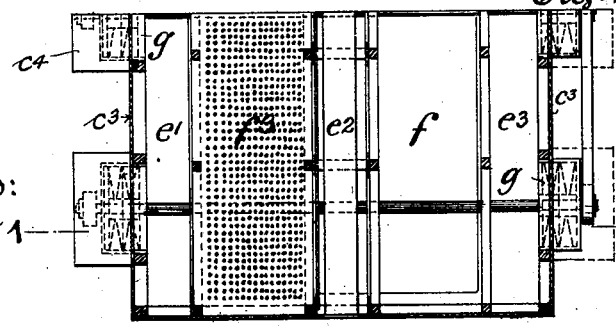

Figure 1 is a vertical section on the line 1 1 of Fig. 2, and Fig. 2 is a horizontal section on the line 2 2 of Fig. 1.

Referring now to the drawings for a further description of my invention, A is a concrete or other foundation in which the catch-basin B is formed.

C is a tower-like structure with roof $c$, vent $c'$, and louvers $c^2$. Within the four outside walls $c^3$ are formed the air-shafts $e'$, $e^2$, and $e^3$ and the water-shafts $f$ and $f'$. The sides $f^2$, forming these water-shafts $f$ and $f'$, are partly open to admit air into the said shafts.

In the water-shafts $f$ and $f'$ are arranged a series of perforated planes or bottoms $f^3$ for a purpose to be presently described, and on the walls $f^4$, forming the central air-shaft $e^2$ above each bottom, are arranged fender-plates $f^5$ to prevent the spraying water from entering the said shaft $e^2$. These walls $f^4$ are provided with openings $f^7$, which may be wholly or partly opened or closed by the slides $f^8$, operated in any suitable manner to regulate the quantity of air to be driven through the various chambers in the water-shafts. The walls $f^4$ at their bottoms are curved, so as to direct the current of air from the fans upwardly. In the outer walls $c^3$ in suitable openings and protected by hoods $c^4$ are arranged two fans $g$, adapted to force air from the outside into and through the various chambers formed in the water-shafts $f$ and $f'$.

In the basin B is arranged an overflow or offtake pipe $b$, and close to the roof $c$ are arranged the hot-water pipes $h$, with spraying-nozzles $h'$. The perforated bottom in the upper tier is extended over the air-shafts $e'$ and $e^3$; but the extension over the air-shafts is not perforated, and below the fans $g$ in the same air-shafts are arranged slanting bottoms to lead the cooled water which may collect into the catch-basin B.

The air-shafts $e'$, $e^2$, and $e^3$ and water-shafts $f$ and $f'$, with fans $g$ arranged oppositely, as shown in Fig. 1, may be built in series, with one, two, or more sets of fans, as shown in Fig. 2, to suit the capacity required.

The operation of the cooling-tower is as follows: The hot water is conducted through the pipes $h$ and spraying-nozzles $h'$ at the top of the tower and, falling through a well-ventilated space onto the upper tier of perforated bottom, is reduced in temperature about 15° to 20°. From this tier the water now percolates through the various perforated bottoms and through the air spaces or chambers, which are constantly supplied with fresh and pure air from the fans and air-shafts, so that when the water reaches the catch-basin B it is reduced in temperature to that of the atmosphere outside the tower.

The central air-shaft $e^2$, with vent $c'$, is especially provided to carry off the moist and hot air or vapor, and to prevent the air which is forced through the various chambers from rushing or blowing water into the central air-chamber $e^2$ the fenders $f^5$ are arranged at each opening. As before stated, the slides $f^8$ at these openings may be operated to regulate the quantity of air to be forced through the various chambers to effect the cooling of the percolating liquid.

Having thus described the nature and objects of my invention, what I claim as new, and desire to secure by Letters Patent, is—

1. A cooling-tower comprising a series of air and water shafts, hot-water-discharge pipes at the top of the tower and a catch-basin at the bottom, a set of perforated planes or bottoms in each of the water-shafts, fans arranged oppositely at the bottom of the tower to force air into the air-shafts $e'$ and $e^3$ and through the chambers of the water-shafts, in combination with an air shaft or vent $e^2$ communicating with each of the chambers, and slides $f^8$ for regulating such communication, substantially as and for the purposes set forth.

2. A cooling-tower comprising a series of air and water shafts, a series of perforated planes or bottoms in each of said water-shafts, arranged one above the other, hot-water-discharge pipes with nozzles arranged in the tops of each tower, louvers and ventilators in the top of each tower, a catch-basin below said water and air shaft, fans arranged oppositely to each other, to force air into the air-shafts $e'$ and $e^3$ and through the chambers of the water-shafts, an air shaft or vent $e^2$ communicating with each of the chambers of the water-shaft, fenders $f^5$ arranged between the chambers of the water-shafts and the said air-shaft $e^2$, and slides $f^8$ on the walls of the air-shaft $e^2$, adapted to regulate the supply of air into the water-shafts substantially as and for the purposes set forth.

In witness whereof I have hereunto set my hand in the presence of two subscribing witnesses.

CARL F. HETTINGER.

Witnesses:
THOMAS F. GROSS,
HERMANN BORMANN.